(12) United States Patent
Bloom

(10) Patent No.: US 6,408,560 B1
(45) Date of Patent: Jun. 25, 2002

(54) FISH NET HANDLE GUIDE AND LOCKING APPARATUS

(76) Inventor: John Bloom, Box 3103, Union Gap, WA (US) 98903

( * ) Notice: Subject to any disclaimer, the term of this patent is extended or adjusted under 35 U.S.C. 154(b) by 0 days.

(21) Appl. No.: 09/693,476

(22) Filed: Oct. 20, 2000

(51) Int. Cl.[7] .............................................. A01K 77/00
(52) U.S. Cl. ........................... 43/12; 403/13; 403/109.3
(58) Field of Search ..................... 43/11, 12; 135/25.1; 403/109.3, 13; 16/429

(56) References Cited

U.S. PATENT DOCUMENTS

| | | | | |
|---|---|---|---|---|
| 619,065 A | * | 2/1899 | Bjornsen ........................ | 43/11 |
| 985,114 A | * | 2/1911 | Covell ........................... | 43/12 |
| 1,416,543 A | * | 5/1922 | Bartos ............................ | 43/12 |
| 1,450,322 A | * | 4/1923 | McElhany ..................... | 43/12 |
| 2,688,815 A | * | 9/1954 | Phillips .......................... | 43/12 |
| 2,725,658 A | * | 12/1955 | Wiederhold et al. ........... | 43/12 |
| 2,800,737 A | * | 7/1957 | Crossan ......................... | 43/12 |
| 4,079,978 A | * | 3/1978 | McMullin ................ | 403/109.3 |
| 4,138,790 A | * | 2/1979 | Schmucker .................... | 43/12 |
| 4,619,065 A | * | 10/1986 | Jones ............................. | 43/11 |
| 4,870,773 A | | 10/1989 | Schmucker .................... | 43/12 |
| 5,515,574 A | * | 5/1996 | Larson .................... | 403/109.3 |
| 5,533,293 A | | 7/1996 | Boehm .......................... | 43/12 |
| 5,607,173 A | * | 3/1997 | Lai .......................... | 403/109.3 |

FOREIGN PATENT DOCUMENTS

FR 22923145 * 7/1976

* cited by examiner

Primary Examiner—Darren W. Ark
(74) Attorney, Agent, or Firm—Liebler, Ivey & Connor; Floyd E. Ivey

(57) ABSTRACT

The invention provides an apparatus permitting single handed extension of a telescoped net handle such that the fisherman grasps the net handle, steps on the most distal portion of the net frame and draws the net handle through a handle guide aperture and counter bore in the handle guide and locking apparatus and toward the extended position. A locking pin assembly presents a spring extended locking pin positioned proximal the handle first end which encounters a chamfer at the fish net handle guide and locking apparatus top side; the chamfer causing the locking pin to depress and enter a locating counterbore which terminates at a locating shoulder. As the net handle is extended further the depressed locking pin terminates extension of the net handle when it encounters the locating shoulder at which point the fisherman's rotation of the handle will cause the locking pin to encounter and enter a locking aperture in the locking assembly thus placing the fish net in condition for secure operation.

12 Claims, 4 Drawing Sheets

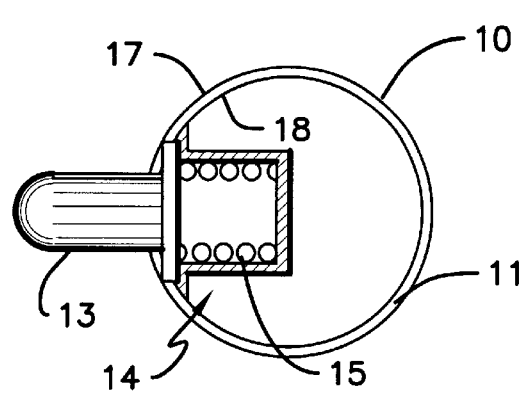
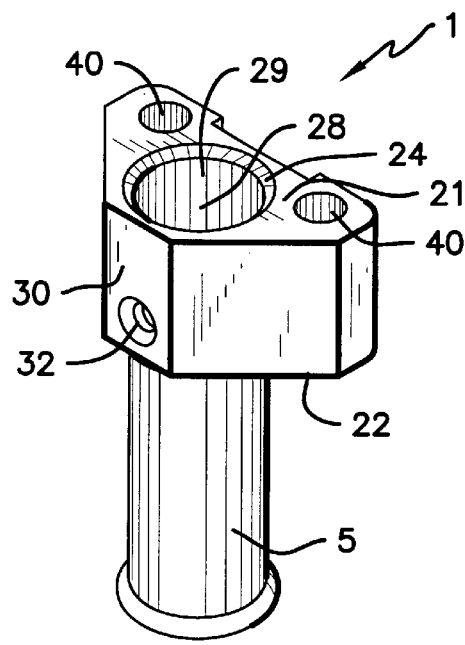
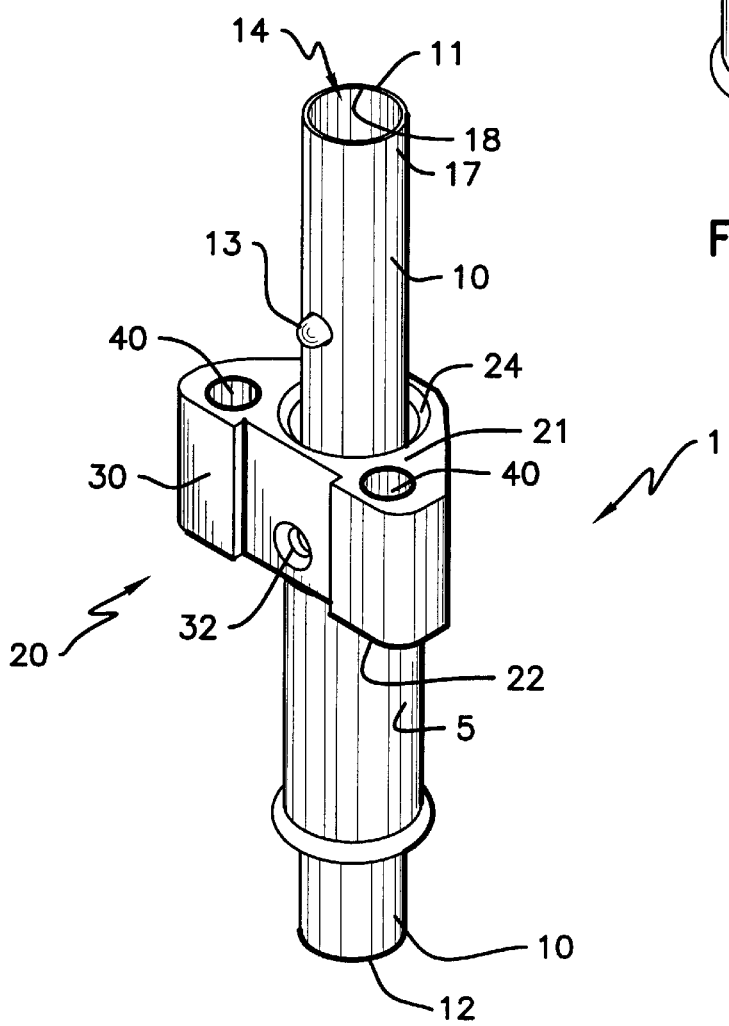

FISH NET HANDLE GUIDE AND LOCKING APPARATUS

FIELD OF THE INVENTION

This invention relates generally to fishing and fish landing nets and particularly to a net handle or shaft guide and handle or shaft locking device.

BACKGROUND OF THE INVENTION

It is common for a fish net handle to be telescopically inter-connected to a handle guide, so as to collapse or withdraw into a fish net means or fish net frame means as a means of reducing the bulk or space occupied by the fish net during transport and while fishing. The use of a fish net with a telescoping or extendable handle requires, preliminary to use in landing a fish, moving the telescoping handle from a collapsed or withdrawn position to the extended position and locking the handle, in a fixture or guide, to insure that the handle remains extended during the fish landing process. Prior art requires the use of two hands to accomplish this maneuver; first in moving the handle from the collapsed position to the point where a locking pin contacts a generally cylindrical handle guide; second in rotating the handle until the locking pin is aligned with an aperture; third in depressing the locking pin and further withdrawing the telescoping handle to allow the locking pin to engage the aperture. Such action is difficult for the fisherman alone with a fish on the line. In addition to complexity of operation, prior art is of substantial complexity in machining or fabrication. U.S. Pat. No. 4,870,773 to Schmucker et al. requires two handed operation. U.S. Pat. No. 5,533,293 to Boehm presents a handle having multiple cross-sections while preferring the release portion of the handle to be circular in cross-section. The patents referred to herein are provided herewith in an Information Disclosure Statement in accordance with 37 CFR 1.97.

SUMMARY OF THE INVENTION

The Fish Net Handle Guide and Locking Apparatus of this invention permits operation with one hand. The operation contemplates the fisherman handling and holding a fishing pole with a fish hooked and ready to be secured in a fish net. The fisherman grasps the handle of the fish net of this invention, steps on the most distal portion of the net frame and draws the handle through a handle guide aperture and counter bore in the handle guide and locking apparatus, toward the extended position. A locking pin assembly presents a spring extended locking pin positioned proximal the handle first end which encounters a chamfer at the fish net handle guide and locking apparatus top side; the chamfer causes the locking pin to depress. As the handle is withdrawn further the depressed locking pin entering a locating counterbore which terminates at a locating shoulder at which point the fisherman's rotation of the handle will cause the locking pin to encounter and enter a locking aperture thus placing the fish net in condition for secure operation.

In the preferred embodiment the locking assembly is composed of plastic formed from an injection molding process. However machining, stamping, extruding, pressing and other manner of metal and material forming may be utilized to construct the invention from metal, composite materials, plastics, nylon and other similar materials.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is a perspective of a Fish Net Handle Guide and Locking Apparatus 1 illustrating the locking assembly 20 with top and bottom side 21, 22, a chamfer 24, outside 30, locking pin aperture 32 and net frame aperture 40. Also shown is the net handle 10, first and second ends 11, 12, locking pin assembly 14 and locking pin 13.

FIG. 2 is a perspective FIG. 1 without the presence of the handle 10. Shown additionally is the locating counterbore 28 and inside 29.

FIG. 3 is a top view of the handle 10 at the first end 11 showing the handle outside and inside, 17, 18, locking pin assembly 14 and locking pin 13. The locking pin assembly 14 is shown in a cutaway view demonstrating a spring biasing means shown here as a coil spring.

DETAILED DESCRIPTION

Figures 4, 5, 6:
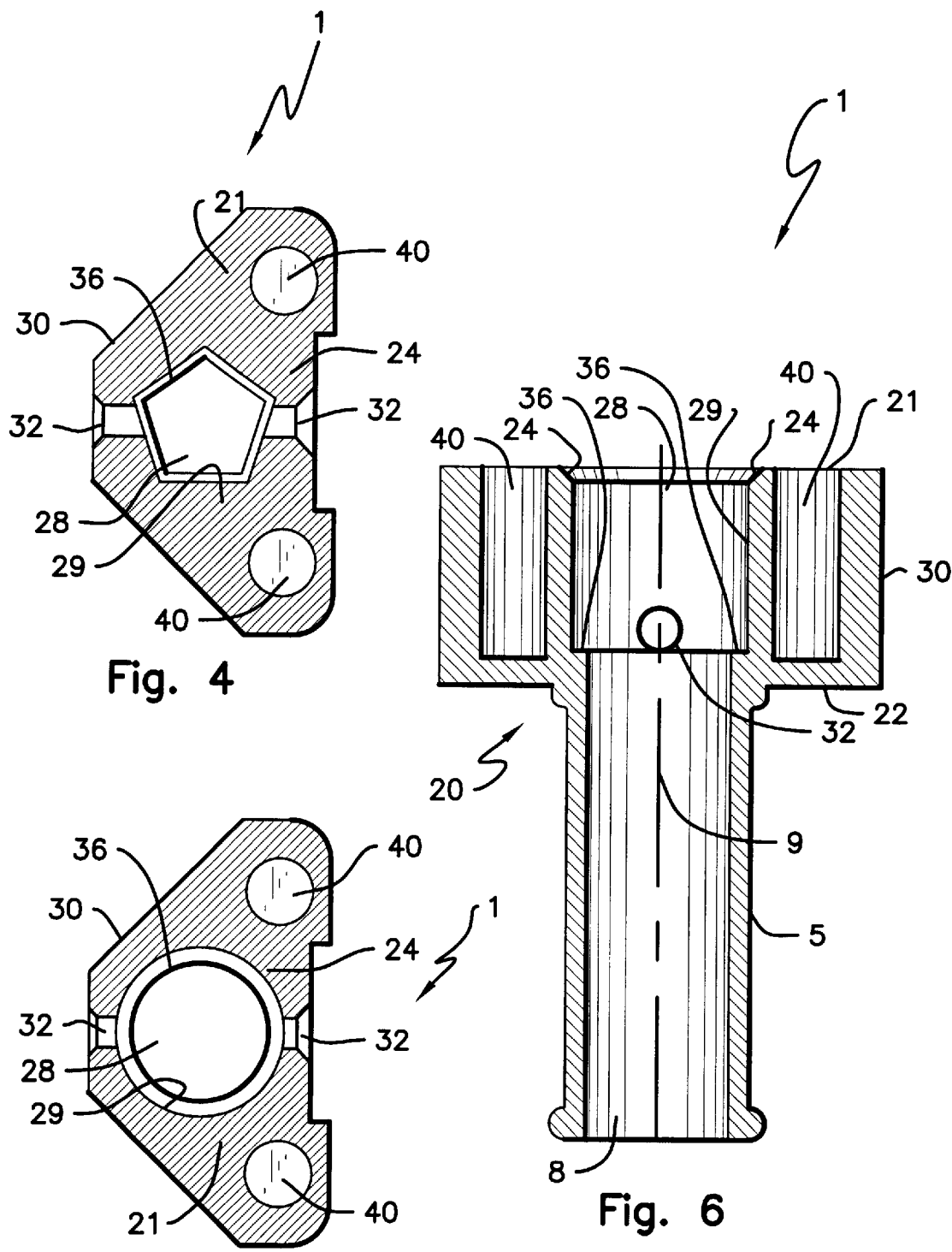
FIG. 4 is a top plan of the fish net handle guide and locking apparatus illustrating the locking assembly 20 with top side 21, a chamfer 24, inside and outside 29, 30, locking pin aperture 32, locating counter bore 28, locating shoulder 36 and net frame apertures 40. In this embodiment the handle 10 is depicted with an pentagonal cross-section.
FIG. 5 is a top plan of the fish net handle guide and locking apparatus as shown in FIG. 4 where the handle 10 cross-section is depicted as circular.
FIG. 6 is a cross-section of the fish net handle guide and locking apparatus 1 of FIG. 2 illustrating the locking assembly 20 with handle guide 5, handle guide aperture 8, handle guide longitudinal axis 9, locating counterbore 28, locating shoulder, top and bottom side 21, 22, chamfer 24, inside and outside 29, 30, locking pin aperture 32 and net frame aperture 40.
Figure 7:
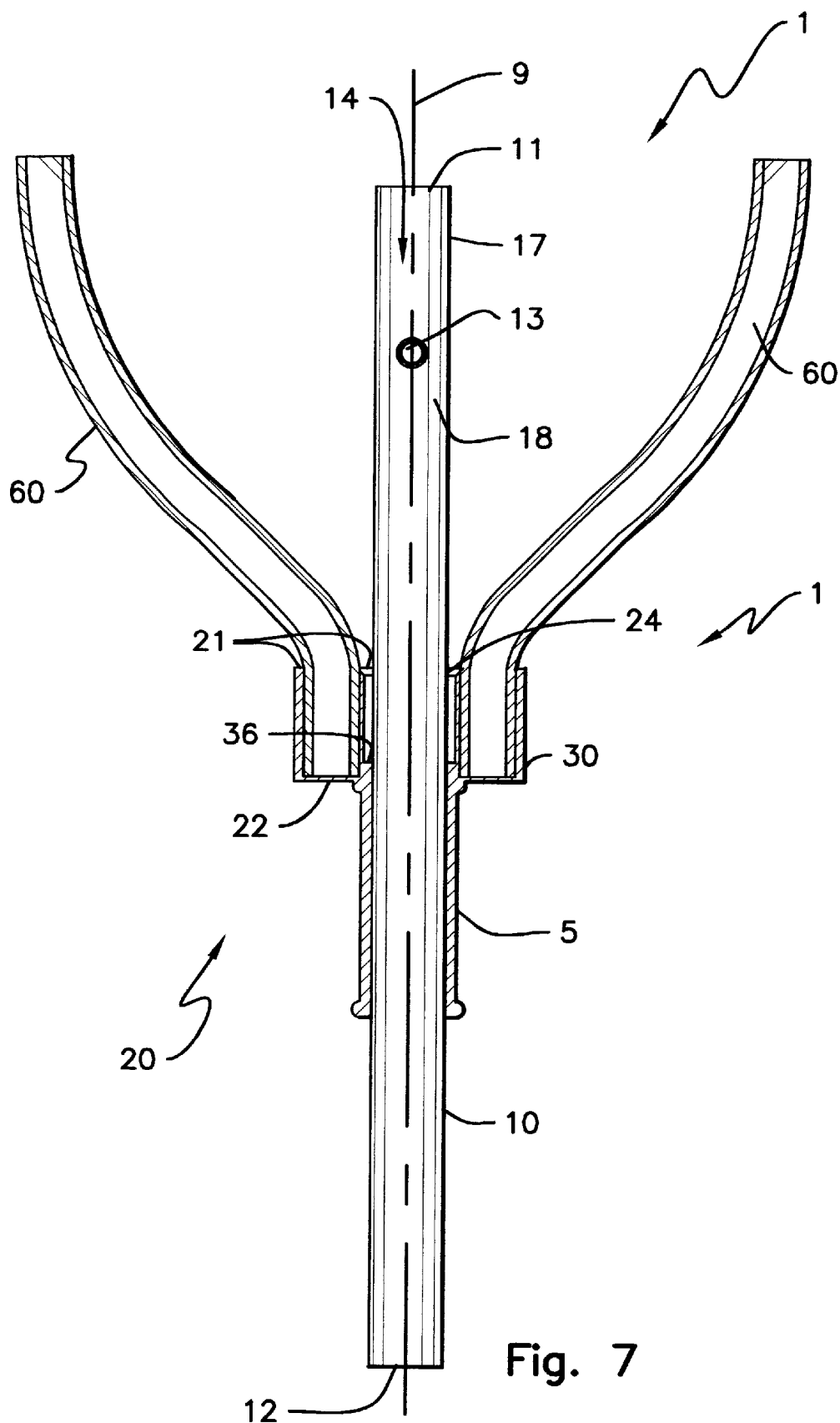
FIG. 7 is a cross-section or cutaway of FIG. 1 of the fish net handle guide and locking apparatus 1 illustrating the locking assembly 20 with handle guide 5, handle guide aperture 8, handle guide longitudinal axis 9, locating counterbore 28, locating shoulder, top and bottom side 21, 22, chamfer 24, inside and outside 29, 30, locking pin aperture 32 and net frame aperture 40. Also seen is the handle 10 with first and second ends 11, 12, handle outside and inside, 17, 18, the locking pin assembly 14 and locking pin 13. Additionally shown are new frame members 60.
Figure 8:
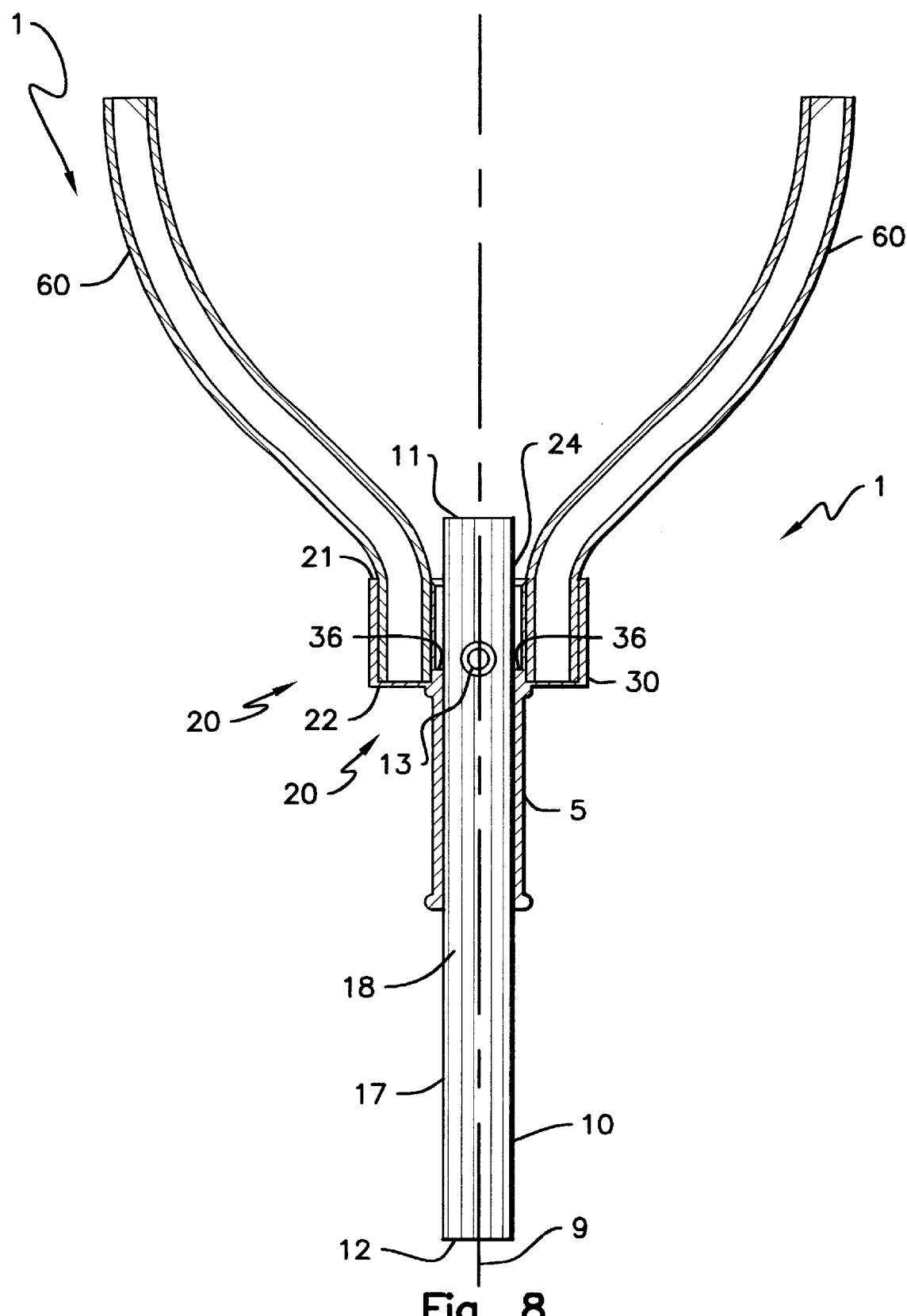
FIG. 8 is a cross-section or cutaway of FIG. 1 with the handle 10 positioned in the extended position with the locking pin 13 positioned to be received into the locking aperture.

The fish net handle guide and locking apparatus 1 of this invention is illustrated in FIGS. 1 through 8. FIGS. 1–3 and 5–8 illustrate the preferred embodiment of the invention. The Fish Net Handle Guide and Locking Apparatus comprises a locking assembly 20 comprising a handle guide 5 having a handle guide aperture 8, a top and bottom side 21, 22, and inside and outside 29, 30; a handle guide longitudinal axis 9 centrally positioned at the handle guide aperture 8 from the top to bottom side 21, 22; a locating counterbore 28 from the top side 21 to a position proximal the bottom side 22 concentrically positioned with the handle guide aperture 8 and handle guide longitudinal axis 9; a chamfer 24 at the interface between the top side 21 and the locating counterbore 28; a locating shoulder 36 at the interface between the locating counterbore 28 and the handle guide aperture 8 concentrically positioned with the handle guide aperture 8 and the locating counterbore 28 and proximal the bottom side 22; the locating shoulder 36 having a diameter, where the handle guide aperture 8 is circular in cross-section, less than the diameter of the locating counterbore 28. A net handle 10 has a first and second end 11, 12; a locking pin assembly 14 fixed by fixing means proximal the handle first end 11 from the handle inside to handle outside 18, 17; the locking pin assembly 14 generally orthogonal to the handle outside 17 and to the handle guide longitudinal axis 9; the locking pin assembly 14 having a locking pin 13 biased by spring means to be extended away from the handle outside 17. There is at least one locking aperture 32 orthogonal to the handle guide longitudinal axis 9 from the inside 29 to the outside 30; the locking aperture 32 sized to receive the locking pin 13. Provided are at least two net frame apertures 40 positioned to extend and support a net distal to the invention and generally parallel to the handle guide longitudinal axis. Net frame means 60 is suggested but not depicted in detail.

The locking assembly 20 will generally be formed for plastic in an injection molding process but as well may be prepared in a machining process from materials subject to machining including metals, plastics and composite materials. The locking pin assembly 14 comprises a locking pin 13 which is generally spring biased; a common formation of the locking pin assembly 14 is comprised of a locking pin 13 received, as an example, into a tube into contact with a coil spring 15 which is resisted by a tube bottom; the locking pin assembly 14 is fixed in the handle 10 by means including, for example, crimping, riveting and other fixing means recognized by those of ordinary skill in the mechanical arts.

A net frame 60, suggested in the drawings, will generally extend outwardly from the locking assembly 20. The net frame 60 portion distal from the locking assembly 20 provides a convenient foothold for the fisherman in gaining resistance to the withdrawal of the handle 10.

The handle 10 may have a variety of cross-sections with a pentagonal cross-section illustrated in FIG. 4. The preferred embodiment is illustrated in FIG. 5 wherein the handle 10 will have a circular cross-section. The locking pin assembly 14 is spring biased with a coil spring 15 suggested merely as an example of biasing means. More than one locking pin assemblies 14 may be fixed in the handle 10 with each having a locking pin 13 and a locking aperture 32 positioned such that each of one or a plurality of locking pins 13 will be received by corresponding locking apertures 32. FIGS. 4 and 5 illustrate a plurality of locking apertures 32. Where the cross-section is other than circular, the cross-section of the locating shoulder 36 will be received within the cross-section of the locating counter bore 28 such that it will obstruct the locking pin 13 and stop movement of the handle 10 when the handle 10 is being extended. It will be recognized by those of ordinary skills in the mechanical arts that the cross-section of the locating counter bore 28 may differ from that of the locating shoulder 36 and handle 10, i.e., the handle 10 and handle guide aperture 8 will have a common cross-section such that the handle guide aperture 8 receives the handle 10 while the locating counter bore 28 and locating shoulder 38 operate to control the locating assembly 14 and locking pin 13. Thus the cross-section of the locating counter bore 28 may differ from that of the locating shoulder 36 with the sole requirement being that the chamfer 24 commence the depression of the locking pin 13, that the locating counter bore 28 complete the depression of the locking pin 13 and that the locating shoulder 36 impede the movement of the handle 10, past the encounter of the locking pin 13 with the locating shoulder 36, when the handle 10 is being extracted. Where the cross-section of the handle 10 is circular the fisherman will be required to rotate the handle 10 to bring the at least one locking pin 13 into alignment with the at least one locking aperture 32 to secure the handle for fish netting purposes.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A fish net handle guide and locking apparatus comprising:

a) locking assembly (20) comprising a handle guide (5) having a handle guide aperture (8), a handle guide longitudinal axis (9) centrally positioned at the handle guide aperture (8); a locating counterbore (28) concentrically positioned relative to the handle guide longitudinal axis (9); a handle (10) having a first and a second end (11, 12); the handle guide aperture (8) receiving the handle (10); the handle (10) concentrically positioned relative to the handle guide longitudinal axis (9); the locking assembly (20) having a chamfer (24) proximal the locating counterbore (28) proximal the handle (10); the handle first end (11) proximal the chamfer when the handle (10) is extended; a locating shoulder (36) at the locating counterbore (28) distal from the chamfer;

b) at least one locking pin assembly (14) fixed by fixing means proximal the handle first end (11) from a handle inside to a handle outside (18, 17); the at least one locking pin assembly (14) having a locking pin (13) biased by spring means to be extended away from the handle outside (17); the locking pin (13) generally orthogonal to the handle outside (17) and to the handle guide longitudinal axis (9); the locating shoulder (36) proximal the handle second end 12) when the handle is collapsed; the locating shoulder (36) dimensioned to obstruct extending movement of the locking pin (13) and handle (10) when the handle (10) is extended;

c) at least one locking aperture (32) in the locking assembly (20); the locking aperture (32) generally orthogonal to the handle guide longitudinal axis (9); the locking aperture (32) proximal the locating shoulder (36) and sized to receive the locking pin (13);

d) one or a plurality of net frame apertures (40) to receive net frame means (60); and wherein when the handle is moved from a collapsed position to an extended position along the handle guide longitudinal axis, the locking pin engages the chamfer and then engages the locating shoulder to thereby obstruct any further extending movement of the handle.

2. A fish net handle guide and locking apparatus of claim 1 comprising:

a) the locking assembly (20) having a top and a bottom side (21, 22), and an inside and an outside (29, 30); the handle guide longitudinal axis (9) centrally positioned from the top to the bottom side (21, 22); the locating counterbore (28) extending from the top side (21) to a position proximal the bottom side (22); the chamfer (24) being at an interface between the top side (21) and the locating counterbore (28); the locating shoulder (36) being at an interface between the locating counterbore (28) and the handle guide aperture (8) and being concentrically positioned with the handle guide aperture (8) and the locating counterbore (28) and also proximal the bottom side (22);

b) the at least one locking pin assembly (14) generally orthogonal to the handle outside and inside (17, 18); the spring means comprising a coil spring;

c) the at least one locking aperture (32) extending from the inside (29) to the outside (30) of the locking assembly.

3. A fish net handle guide and locking apparatus of claim 1 comprising:

a) net frame means (60) providing a net frame structure, distal to the locking assembly (20), to accommodate a fisherman's foot; wherein when the fisherman steps on the net frame means and grasps the handle (10) and extracts or extends the handle (10) to a position distal to the net frame means (60) such that the locking pin (13), proximal the handle first end (11), contacts the chamfer (24) and is depressed allowing the handle (10) to be drawn into the locating counterbore (28) such that the locking pin (13) is stopped by the locating shoulder (36); the handle (10) is rotated, by the fisherman's hand so that the locking pin (13) encounters and is received by the at least one locking aperture (32) so as to secure the handle (10) for netting a fish.

4. A fish net handle guide and locking apparatus of claim 1 further comprising:

a) the handle (10) and handle guide aperture (8) having circular cross sections.

5. A fish net handle guide and locking apparatus of claim 4 further comprising:

a) the locking assembly being formed from plastic.

6. A fish net handle guide and locking apparatus of claim 4 further comprising:

a) the locking assembly being formed from metal.

7. A fish net handle guide and locking apparatus of claim 4 further comprising:

a) the locking assembly being formed from a composite material.

8. A fish net handle guide and locking apparatus of claim 1 further comprising:

a) the handle (10) and handle guide aperture (8) having cross sections which prevent rotation of the handle (10) within the handle guide aperture (8).

9. A fish net handle guide and locking apparatus of claim 8 further comprising:

a) the locking assembly being formed from plastic.

10. A fish net handle guide and locking apparatus of claim 8 further comprising:

a) the locking assembly being formed from metal.

11. A fish net handle guide and locking apparatus of claim 8 further comprising:

a) the locking assembly being formed from a composite material.

12. A method of providing and using a fish net handle guide and locking apparatus comprising:

a) providing a fish net handle guide and locking apparatus comprising: a locking assembly (20) comprising a handle guide (5) having a handle guide aperture (8), a handle guide longitudinal axis (9) centrally positioned at the handle guide aperture (8); a locating counterbore (28) concentrically positioned relative to the handle guide longitudinal axis (9); a handle (10) having a first and a second end (11, 12); the handle guide aperture (8) receiving the handle (10); the handle (10) concentrically positioned relative to the handle guide longitudinal axis (9); the locking assembly (20) having a chamfer (24) proximal the locating counterbore (28) proximal the handle (10); the handle first end (11) proximal the chamfer when the handle (10) is extended; a locating shoulder (36) at the locating counterbore (28) distal from the chamfer; at least one locking pin assembly (14) fixed by fixing means proximal the handle first end (11) from a handle inside to a handle outside (18, 17); the at least one locking pin assembly (14) having a locking pin (13) biased by spring means to be extended away from the handle outside (17); the locking pin (13) generally orthogonal to the handle outside (17) and to the handle guide longitudinal axis (9); the locating shoulder (36) proximal the handle second end 12) when the handle is collapsed; the locating shoulder (36) dimensioned to obstruct extending movement of the locking pin (13) and handle (10) when the handle (10) is extended; at least one locking aperture (32) in the locking assembly (20); the locking aperture (32) generally orthogonal to the handle guide longitudinal axis (9); the locking aperture (32) proximal the locating shoulder (36) and sized to receive the locking pin (13); one or a plurality of net frame apertures (40) to receive net frame means (60);

b) providing a net frame structure which accommodates a fisherman's foot;

c) stepping on the net frame means (60); grasping the handle (10) and extracting or extending the handle (10) through the handle guide aperture (8) to a position distal to the net frame means (60) such that at least one locking pin (13), proximal the handle first end (11), contacts the chamfer (24);

d) depressing the locking pin (13) by contact against the chamfer; drawing the handle (10) into the locating counterbore (28) such that the locking pin (13) is stopped by the locating shoulder (36);

e) rotating the handle (10) so that the at least one locking pin (13) encounters and is received by the at least one locking aperture (32) securing the handle (10) for netting a fish.

* * * * *